United States Patent

[11] 3,584,932

| [72] | Inventor | James R. Terrill<br>Natrona Heights, Pa. |
|---|---|---|
| [21] | Appl. No. | 837,343 |
| [22] | Filed | June 27, 1969<br>Division of Ser. No. 628,549, April 5, 1967,<br>Pat. No. 3,477,118. |
| [45] | Patented | June 15, 1971 |
| [73] | Assignee | Aluminum Company of America<br>Pittsburgh, Pa. |

[54] ALUMINOUS METAL WITH GLASS BEADS BONDED THERETO
3 Claims, No Drawings

[52] U.S. Cl.................................................. 350/105,
 350/109, 29/197.5, 29/473.1
[51] Int. Cl........................................................ G02b 5/12
[50] Field of Search.................................................. 350/104,
 105; 29/197.5, 473.1; 117/33.3, 35; 75/65, 142

[56] References Cited
UNITED STATES PATENTS

| 3,005,382 | 10/1961 | Weber............................ | 350/105 |
| 3,190,178 | 6/1965 | McKenzie........................ | 350/105 |
| 3,279,316 | 10/1966 | Penton et al..................... | 350/105 |
| 3,311,441 | 3/1967 | Gill................................. | 350/105 |
| 3,355,311 | 11/1967 | Gosselink........................ | 350/105 UX |
| 3,413,058 | 11/1968 | Tung et al....................... | 350/105 |

*Primary Examiner*—David Schonberg
*Assistant Examiner*—Michael J. Tokar
*Attorney*—Carl R. Lippert

ABSTRACT: A reflective composite having glass beads bonded to an aluminous metal substrate by a fused alloy containing aluminum, silicon and magnesium.

ALUMINOUS METAL WITH GLASS BEADS BONDED THERETO

This is a division of U.S. Ser. No. 628,549, filed Apr. 5, 1967, and now U.S. Pat. No. 3,477,118.

This invention relates to, and has for its object, providing for the brazing of glass beads to a metallic substrate, preferably an aluminous metal substrate. The glass beads impart a reflective characteristic to the substrate rendering the composite useful in such applications as reflective signs for highways and the like.

The addition of 1 percent to 8 percent, preferably 4 percent to 6 percent magnesium to an aluminum brazing filler alloy permits brazing glass beads, and the like, to any other member adapted to aluminum brazing procedures. As is known, various aluminum brazing filler alloy compositions are available and, for the most part, consist of an alloy of aluminum and about 4 percent to 13 percent silicon. In some cases, substantial amounts of copper, 3 percent to 5 percent or zinc 3 percent to 10 percent or both may also be included. In practicing the invention, magnesium in the amounts herein stated is added to such aluminum base brazing alloys.

Aluminum brazing filler alloys are available in various forms, the most popular being wire, shims and as a cladding layer on the composite product known as brazing sheet. Examples of suitable brazing sheet composites comprising an aluminum alloy core and an integral cladding layer of aluminum brazing alloy are provided by the disclosure of U.S. Pat. No. 2,312,039. In practicing the invention, such brazing sheet products are advantageously employed, provided the brazing alloy layer composition is as provided herein. By way of illustration, brazing sheet suitable in practicing the invention includes the herein described brazing alloy cladding and a core layer of aluminum alloy 3003 (Al, 1.2 percent Mn) or alloy 6951 (Al, 0.25 percent Cu, 0.35 percent Si, 0.65 percent Mg. The cladding normally constitutes 5 percent to 10 percent of the total thickness.

Glass beads suitable for use in practicing the invention are those normally employed for reflective purposes. Such beads range in size from one-sixteenth to one-fourth inch in diameter. The beads may be spherical although other shapes may be used in which case the diameter refers to a characteristic dimension. The substrate to which the beads are bonded by brazing is preferably aluminous by which is meant composed of aluminum or an alloy thereof. However, composites comprising aluminum and another metal such as steel or stainless steel can have their aluminous surfaces brazed. Therefore, in practicing the invention all that is necessary is that the substrate have a surface adapted to brazing with an aluminum brazing filler alloy.

In providing the improved composite, the following method may be employed. The brazing filler alloy is brought to brazing temperature, i.e. a temperature which melts the filler but not the substrate. This temperature generally ranges from about 1050° to 1175°F. While the filler alloy is molten, the glass beads are applied thereto, desirably in a sprinkling fashion. It is preferable that the glass beads be first heated, before application to the molten brazing alloy, to a temperature approximating the brazing temperature, i.e. a temperature of about 900° f., preferably 1000° F., or more, to avoid excessive thermal shock to the glass beads. The impact of the particles striking the molten layer is sometimes adequate to provide sufficient wetting thereof by the molten alloy, although wetting may be further assured by mechanically disturbing the beads as by slightly rotating or pressing with a graphite spatula or the like. It is advisable not to wet an excessive portion of the bead surface. That is, only the bead underside, and not the outer reflective surface, should be wetted. The temperature is then lowered to allow the molten brazing alloy to solidify which completes the joining process.

The composite formed as described will be characterized by a substrate having a surface adapted to aluminum brazing, with glass beads brazed thereto by fusion of an aluminum brazing alloy consisting essentially of aluminum, 4 percent to 13 percent silicon and 1 percent to 8 percent, preferably 4 percent to 6 percent, magnesium. The beads are usually bonded with such adherence that they will break when attempts are made to remove them from the substrate. The fused aluminum brazing alloy further provides a highly reflective surface on the underside of the beads. The composite therefore has a very high degree of reflectance and is thus useful for applications such as highway markers.

While the invention has been described in terms of preferred embodiments, the claims appended hereto are intended to encompass all embodiments which fall within the spirit of the invention.

What I claim is:
1. A reflective composite article comprising:
   1. an aluminum substrate composed of aluminum or an alloy thereof,
   2. a layer of fused aluminum brazing alloy integrally bonded to said substrate, said alloy consisting essentially of aluminum, 4 percent to 13 percent silicon and 1 percent to 8 percent magnesium,
   3. a plurality of glass beads embedded in and bonded to said fused aluminum joining alloy.
2. The composite article according to claim 1 wherein the fused aluminum brazing alloy layer contains 4 percent to 6 percent magnesium.
3. The composite article according to claim 1 wherein the glass beads are from one-sixteenth to one-fourth inch in diameter.